(12) United States Patent  
Gospodinov et al.

(10) Patent No.: US 11,210,414 B2  
(45) Date of Patent: Dec. 28, 2021

(54) BIOMETRIC SENSOR AND PROCESSOR PAIRING

(71) Applicant: GEMALTO INC, Austin, TX (US)

(72) Inventors: Dimitar Gospodinov, Burke, VA (US); Ksheerabdhi Krishna, Cedar Park, TX (US); Simon Tan, Hacienda Heights, CA (US); Tao Zheng, Thousand Oaks, CA (US)

(73) Assignee: THALES DIS USA, INC., Austin, TX (US)

( * ) Notice: Subject to any disclaimer, the term of this patent is extended or adjusted under 35 U.S.C. 154(b) by 280 days.

(21) Appl. No.: 16/231,705

(22) Filed: Dec. 24, 2018

(65) Prior Publication Data

US 2020/0202022 A1 Jun. 25, 2020

(51) Int. Cl.

| | | |
|---|---|---|
| *G06F 21/62* | (2013.01) | |
| *G06F 21/78* | (2013.01) | |
| *G06K 9/00* | (2006.01) | |
| *H04L 9/08* | (2006.01) | |
| *H04L 9/32* | (2006.01) | |

(52) U.S. Cl.
CPC .......... *G06F 21/6209* (2013.01); *G06F 21/78* (2013.01); *G06K 9/00067* (2013.01); *H04L 9/0869* (2013.01); *H04L 9/3242* (2013.01); *G06F 2221/2141* (2013.01)

(58) Field of Classification Search
CPC ................. G06F 21/6209; G06F 21/78; G06F 2221/2141; G06K 9/00067; H04L 9/0869; H04L 9/3242; H04L 63/0861
See application file for complete search history.

(56) References Cited

U.S. PATENT DOCUMENTS

| 7,725,732 | B1 | 5/2010 | Ballard | |
|---|---|---|---|---|
| 2009/0037743 | A1* | 2/2009 | Narayanaswami | ... H04L 9/3231 |
| | | | | 713/186 |
| 2012/0016798 | A1* | 1/2012 | Carper | ............... G06Q 20/1085 |
| | | | | 705/43 |
| 2014/0006277 | A1* | 1/2014 | Rao | ..................... G06Q 20/3572 |
| | | | | 705/41 |

(Continued)

OTHER PUBLICATIONS

PCT/EP2019/086903, International Search Report, dated Feb. 14, 2020, European Patent Office, P.B 5818 Patentlaan 2 NL—2280 HV Rijswijk.

*Primary Examiner* — Kevin Bechtel  
*Assistant Examiner* — Sangseok Park  
(74) *Attorney, Agent, or Firm* — The Jansson Firm; Pehr B. Jansson

(57) ABSTRACT

The present invention relates to a biometric system (FBS) comprising a sensor (FS) and a secure execution environment (SEE) as separate physical components, said biometric system being intended to be used in cooperation with a biometric application (BA), wherein said secure execution environment (SEE) comprises a data processing component (DP) and a secure memory (SEM) storing data enabling to access calibration data as determined at the time of the physical pairing of the sensor (FS) and the secure execution environment (SEE), said data processing component (DP) using the calibration data as retrieved when raw biometric data are received from the sensor (FS) to produce biometric sample to be used in the biometric application (BA).

4 Claims, 2 Drawing Sheets

(56) References Cited

U.S. PATENT DOCUMENTS

| | | | |
|---|---|---|---|
| 2015/0310720 A1* | 10/2015 | Gettings | G08B 29/188 |
| | | | 340/540 |
| 2016/0269418 A1* | 9/2016 | Sangary | G06F 21/6245 |
| 2016/0277930 A1 | 9/2016 | Li et al. | |
| 2017/0055906 A1 | 3/2017 | Bremer | |
| 2017/0215016 A1* | 7/2017 | Dohmen | H04R 1/1091 |
| 2018/0041503 A1 | 2/2018 | Lindemann | |
| 2021/0142036 A1* | 5/2021 | Andersen | G06K 9/00067 |

* cited by examiner

BIOMETRIC SENSOR AND PROCESSOR PAIRING

FIELD OF THE INVENTION

The present invention relates to a biometric system comprising a sensor and a secure execution environment as separate physical components, said biometric system being intended to be used in cooperation with a biometric application.

The invention also pertains to a method to pair a sensor with a secure execution environment, the both being two separate physical components, said biometric system being intended to be used in cooperation with a biometric application.

BACKGROUND OF THE INVENTION

FIG. 1 represents a typical biometric system FBS as interested by the invention. This biometric system includes, at least, the following components: a sensor FS and a data processing component DP. This biometric system interacts with a biometric application BA.

The basic workflow in such a biometric system FBS is as follows: a subject presents biometric element, for example a finger, to the biometric sensor FS. The sensor FS acquires the biometric sample BSPL presented and outputs raw sample data RBSPL. Data Processing component DP performs image processing algorithms and transforms the raw data RBSPL into a fingerprint image PBSPL that can be used in Biometric Application BA, for example for identification or verification of the subject. The process of transforming the raw data RBSPL into a fingerprint image PBSPL accounts for the physical parameters of the sensor FS. The physical parameters represent the natural variations that exist in each instance of the sensor FS. For example these variations could be due to the sensor FS manufacturing process, variations in the physical properties of the materials used and tolerances of the sensor FS itself and any supporting components. Typically light sources and optical elements have a specific unique imprint. Normally, as part of the sensor FS manufacturing, a calibration takes place, in the factory. The calibration process captures and saves calibration data specific for each sensor FS manufactured. That calibration data is accessed and used by the Data Processing component DP.

An increasingly common requirement is the repudiation of an illegitimate sensor. There is thus a need to ensure that a sensor cannot be replaced by the end user, or substituted with something else, for example not a sensor. The problem is to implement this requirement without increasing cost, sensor and system complexity.

Further alternative and advantageous solutions would, accordingly, be desirable in the art.

SUMMARY OF THE INVENTION

The present invention aims at insuring that the data will not be processed when the fingerprint sensor used to capture biometric data is not the one as used at the manufacturing time.

The present invention is defined, in its broadest sense, as a biometric system comprising a sensor and a secure execution environment as separate physical components, said biometric system being intended to be used in cooperation with a biometric application, wherein said secure execution environment comprises a data processing component and a secure memory storing data enabling to access calibration data as determined at the time of the physical pairing of the sensor and the secure execution environment, said data processing component using the calibration data as retrieved when raw biometric data are received from the sensor to produce biometric sample to be used in the biometric application.

The invention is a unique solution in terms of cost and simplicity. It enables the use of cost effective, resource constrained processors, where biometric sensor processor pairing is required. According to the invention, the biometric sensor and the Secure Execution Environment (SEE) are separate, physical components, i.e. for example that they are constituted by electronic modules connected via cable or PCB traces.

For the invention to be implemented, it is necessary for the biometric sensor to provide a mechanism to read and write its calibration data, for example in a non-volatile memory.

According to a first embodiment of the invention, said secure memory storing calibration data obtained from the sensor at the time of the physical pairing of the sensor and the secure execution environment, said data processing component using the calibration data as stored in the secure execution environment when raw biometric data are received from the sensor to produce biometric sample to be used in the biometric application, the calibration data being erased from the sensor, after it has been read by the SEE at the time of physical pairing.

This very simple embodiment enables the SEE to be the guarantor that the calibration data as defined at the time of pairing are the ones used for the processing of any further raw biometric sample. A correct result will be obtained only in the case the raw data come from the right fingerprint sensor having these calibration data.

According to a second embodiment, said secure memory having a cryptographic key storage storing SEE personalization cryptographic keys, said sensor comprising a memory storing calibration data encrypted by the SEE using a SEE personalization cryptographic key, said calibration data having been erased from the sensor, after it has been read by the SEE at the time of physical pairing, said data processing component:

retrieving the encrypted calibration data from the memory of the sensor when raw biometric data are received from the sensor, decrypting the calibration data using the personalization cryptographic key and using the decrypted calibration data to produce biometric sample to be used in the biometric application.

This embodiment exploits the unique capabilities of the SEE to keep cryptographic key and to perform cryptographic calculation to achieve the desired goal.

According to a third embodiment, said secure memory storing, to check that calibration data as received from the sensor at the time of field operations, an SEE generated random number and a hash of the combination of the generated random number and calibration data as received at the time of the physical pairing of the sensor and the secure execution environment.

This embodiment enables to let the fingerprint sensor managing the calibration data as in the currently known biometric sensor. In this case, the own calibration data of the sensor remains on-board as such and are not deleted after pairing with a secure execution environment.

The invention also relates to a method to pair a sensor with a secure execution environment, the both being two separate physical components, said biometric system being intended to be used in cooperation with a biometric application, said secure execution environment comprising a data processing component and a secure memory storing data enabling to access calibration data as determined at the time of the physical pairing of the sensor and the secure execution environment, said method comprising the steps of:

for the SEE, retrieving the calibration data as determined at the time of the physical pairing of the sensor and the secure execution environment, using the calibration data as retrieved when raw biometric data are received from the sensor to produce biometric sample to be used in the biometric application.

According to a first embodiment, said method comprises the steps of, at a secure manufacturing premise:

for the sensor, determining calibration data, for the secure execution environment, reading the calibration data at the sensor and storing the calibration data in its memory for them to be used by the data processing component later on when, in field operation, raw biometric data are received from the sensor and combined with the stored calibration data to produce biometric sample to be used in the biometric application, for the sensor, deleting calibration data once read by the secure execution environment.

According to a second embodiment, said method comprises the steps of:

at a secure manufacturing premise, in the secure execution environment, storing SEE personalization cryptographic keys in the secure memory of the SEE, for the sensor, determining calibration data, for the secure execution environment, reading the calibration data at the sensor, encrypting the calibration data using a stored SEE personalization cryptographic key and sending the thus encrypted calibration data back to the sensor for them to be used later on while processing the following steps once the paired sensor and the biometric system are in field operation:

for the secure execution environment, receiving raw biometric data from the sensor, retrieving encrypted calibration data from the sensor, decrypting the calibration data using the personalization cryptographic key and using the thus decrypted calibration data to produce biometric sample to be used in the biometric application, for the sensor, deleting calibration data once read by the secure execution environment.

According to a third embodiment, said method comprises the steps of, at a secure manufacturing premise:

for the sensor, determining calibration data, for the secure execution environment having a random number generator and a computation module, reading the calibration data at the sensor, in the secure execution environment, generating a random number, calculating a hash of a combination of the generated random number and the calibration data as read and storing the generated random number and the calculated hash, for the secure execution environment, receiving raw biometric data from the sensor, retrieving calibration data from the sensor, calculating a hash of the combination of the retrieved calibration data and the stored random number, comparing the calculated hash with the stored hash, authorizing the data processing only in case the compared hash are identical.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
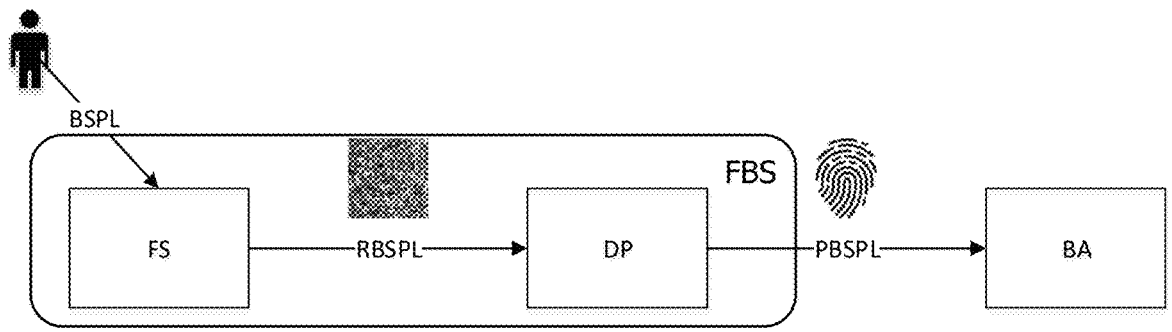
FIG. 1 represents a biometric system of the prior art.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

The proposed invention permanently ties a sensor and Data Processing components located in a secure execution environment, in a non-interchangeable way. The implementation of the invention appears in communication packet trace analysis between the fingerprint sensor and the secure execution environment. Three embodiments of the invention are proposed below.

Figure 2:
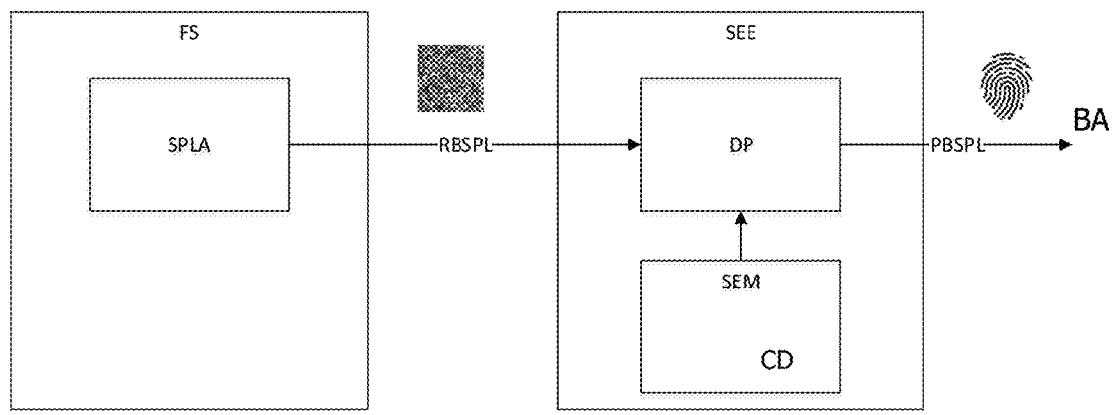
FIG. 2 represents a biometric system according to a first embodiment of the invention.

FIG. 2 schematically describes a first embodiment of the invention. In this first approach, calibration data CD is copied in a secure memory SEM of the SEE at the time of manufacturing and erased from the Fingerprint sensor FS. The SEE thus provides a mechanism for permanent, secure storage of the calibration data CD, not accessible outside of the SEE. Typically via built-in FLASH memory, which outlives lifecycle steps like firmware update.

In this embodiment, at the time of manufacturing, the Fingerprint sensor FS contains its calibration data CD, stored as plain text. Typically such calibration data are determined during the sensor manufacturing.

At the time of the pairing of the SEE and the fingerprint sensor FS, the SEE reads the sensor plain text calibration data CD from the connected Fingerprint sensor FS and writes the sensor plain text calibration data CD into its internal-only storage, not accessible outside of the SEE.

Then the SEE monitor the erasing of the sensor plain text calibration data CD from the connected and paired Fingerprint sensor FS.

During normal operation as shown on FIG. 2, the following steps take place:

The SEE has the sensor calibration data CD stored in its internal-only storage SEM;

A individual presents a sample to the Fingerprint sensor FS and a sample acquisition module SPLA acquires raw biometric sample data RBSPL and sends it to the Data Processing component DP in the SEE;

The Data Processing component DP uses the calibration data CD available in the secure memory SEM of the SEE to process the raw data RBSPL and to produce biometric sample PBSPL that can be used in a biometric application BA.

If the Fingerprint sensor is replaced, the calibration data will not correspond to the one of the genuine sensor and erroneous processed biometric sample will be obtained.

The SEE will fail to access the calibration data CD of the replacing sensor thus preventing operation of the Data Processing component DP, and/or optionally, indicate a tamper event.

Figure 3:
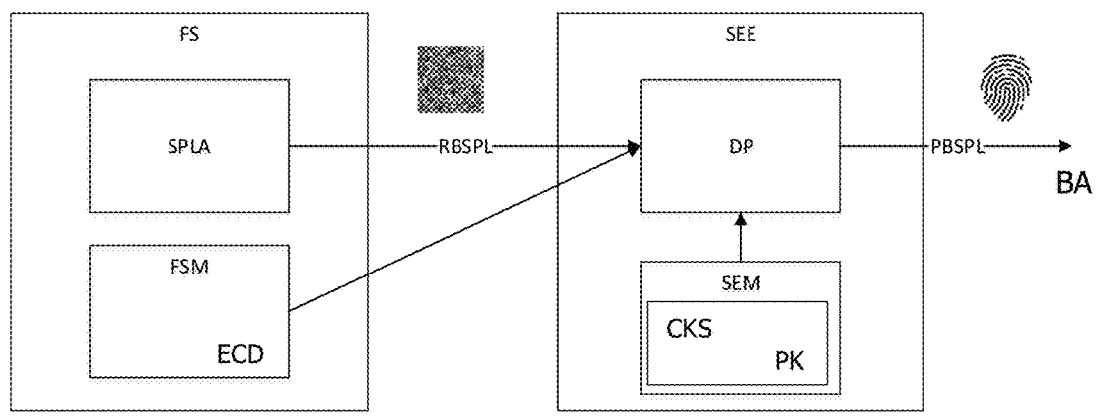
FIG. 3 represents a biometric system according to a second embodiment of the invention.

FIG. 3 schematically describes a second embodiment of the invention. In this second approach, where the SEE is resource constrained, but has cryptographic capabilities, for example a micro-controller with built-in cryptographic functions. Such functions comprises storage of keys PK and cryptographic processing.

In this embodiment, the SEE is personalized in a secure facility. At this time, cryptographic keys PK are randomly generated and stored within the SEE Cryptographic Key Storage. Those keys PK never leave the SEE.

In parallel, before the pairing, the Fingerprint sensor FS contains its calibration data CD, stored as plain text.

According to this embodiment, the SEE reads the sensor plain text calibration data CD, from the connected Fingerprint sensor FS. Then, in this embodiment, the SEE encrypts the calibration data CD using SEE cryptographic key PK as previously generated. Then still during the pairing, the SEE writes the encrypted calibration data ECD back to the Fingerprint sensor FS, overwriting the plain text data CD.

In this embodiment, calibration data CD is stored in the sensor FS itself, but in encrypted form. The encrypted calibration data ECD can be decrypted only by the SEE that encrypted it.

During field operation, the SEE reads the encrypted calibration data ECD from the Fingerprint sensor FS. The SEE then decrypts the calibration data CD using its cryptographic key PK. On successful decryption the SEE is ready to receive raw biometric samples RBSPL from the Fingerprint sensor FS when an individual presents a sample to the Fingerprint sensor FS.

The sample acquisition module SPLA of the Fingerprint sensor FS acquires raw biometric sample data RBSPL and sends it to the Data Processing component DP in the SEE.

The Data Processing component DP uses the calibration data CD decrypted as above described to process the raw data RBSPL and to produce biometric sample PBSPL that can be used in a biometric application BA.

With the invention, if the encrypted calibration data ECD has been somehow copied as encrypted into another sensor, the Data Processing component DP will fail to produce proper biometric samples because the calibration data CD is not from the attached Fingerprint sensor FS.

Figure 4A:
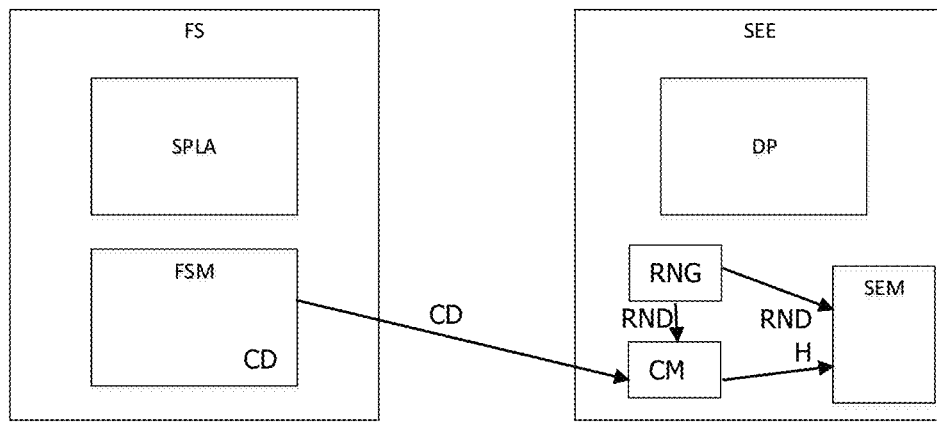
FIGS. 4A and 4B represent a biometric system according to a third embodiment, respectively at the manufacturing time and at field operation time.
Figure 4B:
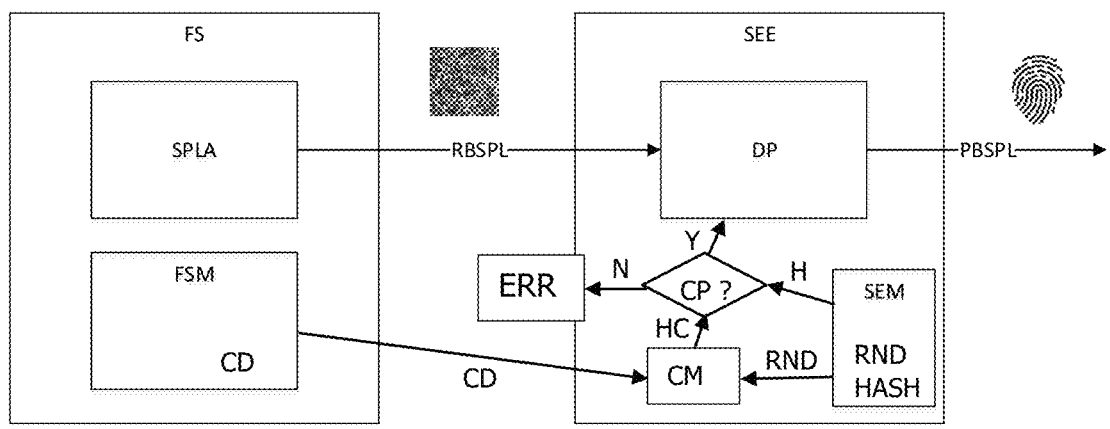

FIGS. 4A and 4B schematically represents a third embodiment of the invention. In this third embodiment, the SEE has a Random Number Generator RNG, processing capabilities CM and storage capabilities, typically a secure memory SEM. A particularly interesting embodiment implements a micro-controller with built-in memory and Random Number Generator RNG.

During secure manufacturing, the following steps take place:

The Fingerprint sensor contains its calibration data CD, stored in a memory FSM during the sensor manufacturing;

The SEE reads the sensor calibration data CD, from the connected Fingerprint sensor FS;

A calculation module CM of the SEE calculates hash H of the combination of calibration data CD and a generated random number RND;

The SEE stores the calculated hash H and the generated random number RND, securely, in its internal storage SEM.

During normal operation, the following steps take place:

The SEE reads the calibration data CD from the memory FSM of the Fingerprint sensor FS;

The SEE calculates a current hash HC of the combination of calibration data CD and the random number RND previously stored in its internal storage SEM;

The SEE compares the calculated hash HC with the hash H previously stored in its internal storage SEM;

If the hashes match (case Y), the SEE allows usage of the Fingerprint sensor FS and the processing by the data processing component DP;

If the hashes do not match, the SEE can conclude that the sensor FS has been changed and disallows usage and raises an error ERR.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to pair a sensor (FS) with a secure execution environment (SEE), the both being two separate physical components, said biometric system being intended to be used in cooperation with a biometric application, said secure execution environment comprising a data processing component and a secure memory storing data enabling to access calibration data as determined at the time of the physical pairing of the sensor and the secure execution environment, said method comprising the steps of:

for the SEE, retrieving the calibration data as determined at the time of the physical pairing of the sensor and the secure execution environment, using the calibration data as retrieved when raw biometric data are received from the sensor to produce biometric sample to be used in the biometric application;

at a secure manufacturing premise, in the secure execution environment, storing SEE personalization cryptographic keys in the secure memory of the SEE, for the sensor, determining calibration data, for the secure execution environment, reading the calibration data at the sensor, encrypting the calibration data using a stored SEE personalization cryptographic key and sending the thus encrypted calibration data back to the sensor for the encrypted calibration data to be used later on while processing the following steps once the paired sensor and the biometric system are in field operation:

for the secure execution environment, receiving raw biometric data from the sensor, retrieving encrypted calibration data from the sensor, decrypting the calibration data using the personalization cryptographic key and using the thus decrypted calibration data to produce biometric sample to be used in the biometric application, for the sensor, deleting calibration data once read by the secure execution environment.

2. A method to pair a sensor (FS) with a secure execution environment (SEE), the both being two separate physical components, said biometric system being intended to be used in cooperation with a biometric application, said secure execution environment comprising a data processing component and a secure memory storing data enabling to access calibration data as determined at the time of the physical pairing of the sensor and the secure execution environment, said method comprising the steps of:

for the SEE, retrieving the calibration data as determined at the time of the physical pairing of the sensor and the secure execution environment, using the calibration data as retrieved when raw biometric data are received from the sensor to produce biometric sample to be used in the biometric application; said method further comprising the steps of, at a secure manufacturing premise:

for the sensor, determining calibration data, for the secure execution environment having a random number generator and a computation module, reading the calibration data at the sensor, in the secure execution environment, generating a random number, calculating a hash of a combination of the generated random number and the calibration data as read and storing the generated random number and the calculated hash, for the secure execution environment, receiving raw biometric data from the sensor, retrieving calibration data from the sensor, calculating a hash of the combination of the retrieved calibration data and the stored random number, comparing the calculated hash with the stored hash, authorizing the data processing only in case the compared hash are identical.

3. A biometric system (FBS) comprising a sensor (FS) and a secure execution environment (SEE) as separate physical components, said biometric system being intended to be used in cooperation with a biometric application (BA), wherein said secure execution environment (SEE) comprises a data processing component (DP) and a secure memory (SEM) storing data enabling to access calibration data as determined at the time of the physical pairing of the sensor (FS) and the secure execution environment (SEE), said data processing component (DP) using the calibration data as retrieved when raw biometric data are received from the sensor (FS) to produce biometric sample to be used in the biometric application (BA); wherein:

the secure execution environment being configured to store SEE personalization cryptographic keys in the secure memory of the SEE at a secure manufacturing premise, the sensor being configured to determine calibration data at the secure manufacturing premise, the secure execution environment being configured to read the calibration data at the sensor, encrypt the calibration data using a stored SEE personalization cryptographic key and send the thus encrypted calibration data back to the sensor for the encrypted calibration data to be used later on while processing the following functions once the paired sensor and the biometric system are in field operation:

the secure execution environment being further configured to receive raw biometric data from the sensor, retrieve encrypted calibration data from the sensor, decrypt the calibration data using the personalization cryptographic key and use the thus decrypted calibration data to produce biometric sample to be used in the biometric application, the sensor being further configured to delete calibration data once read by the secure execution environment.

4. A biometric system (FBS) comprising a sensor (FS) and a secure execution environment (SEE) as separate physical components, said biometric system being intended to be used in cooperation with a biometric application (BA), wherein said secure execution environment (SEE) comprises a data processing component (DP) and a secure memory (SEM) storing data enabling to access calibration data as determined at the time of the physical pairing of the sensor (FS) and the secure execution environment (SEE), said data processing component (DP) using the calibration data as retrieved when raw biometric data are received from the sensor (FS) to produce biometric sample to be used in the biometric application (BA); wherein:

the sensor being configured to determine calibration data at a secure manufacturing premise, the secure execution environment being configured to have a random number generator and a computation module, read the calibration data at the sensor, in the secure execution environment, generate a random number, calculate a hash of a combination of the generated random number and the calibration data as read and store the generated random number and the calculated hash, the secure execution environment being further configured to receive raw biometric data from the sensor, retrieve calibration data from the sensor, calculate a hash of the combination of the retrieved calibration data and the stored random number, compare the calculated hash with the stored hash, authorize the data processing only in case the compared hash are identical.

* * * * *